United States Patent
Tanaka et al.

[19]

[11] Patent Number: 6,127,677
[45] Date of Patent: Oct. 3, 2000

[54] OPTICAL ENCODER HAVING OPTICAL CONDUCTOR AT THE OUTER CIRCUMFERENCE OF ROTOR

[75] Inventors: Masanobu Tanaka; Tatsumaro Yamashita; Shoichi Kyoya, all of Miyagi-ken, Japan

[73] Assignee: Alps Electric Co., Ltd., Tokyo, Japan

[21] Appl. No.: 09/111,992

[22] Filed: Jul. 8, 1998

[30] Foreign Application Priority Data

Jul. 8, 1997 [JP] Japan .................................. 9-182763

[51] Int. Cl.[7] ...................................................... G01D 5/34
[52] U.S. Cl. ................................ 250/231.14; 250/231.18; 360/73.14
[58] Field of Search ......................... 250/231.13, 231.14, 250/231.19, 231.18, 237 R, 559.32; 341/2, 13; 242/334.3, 334.4; 356/375; 360/73.09, 73.11, 73.14

[56] References Cited

U.S. PATENT DOCUMENTS 4,788,422 11/1988 Fujiwara ............................ 250/231.13
5,569,912 10/1996 Turk et al. .

FOREIGN PATENT DOCUMENTS 646 796 A1   9/1994   European Pat. Off. .
1259 621     1/1968   Germany .
WO 92/20154  11/1992  Germany .
1 461 201    1/1997   United Kingdom .

Primary Examiner—Seungsook Ham
Assistant Examiner—Kevin Pyo
Attorney, Agent, or Firm—Brinks Hofer Gilson & Lione

[57] ABSTRACT

Light emitted from a light emitting device is reflected by a first reflection curved face so that the travel direction of the light is almost perpendicularly diffused, the light is reflected by a reflection face circumferentially formed on an end face of a rotor in the direction parallel to an axial line, and after that, the light is supplied to a stator side along a cylindrical part on the outer periphery of the rotor. In a stator, light is condensed again in the axial direction by a reflection face and, after that, the light is reflected by a second reflection curved face and is received by a photo sensing device. In this instance, since the light passed through whole slits on the end face of the rotor and whole slits in the peripheral part of the stator is converged and then detected by an FG, the signal level upon detection is increased, the detection accuracy is improved at low cost.

6 Claims, 6 Drawing Sheets

OPTICAL ENCODER HAVING OPTICAL CONDUCTOR AT THE OUTER CIRCUMFERENCE OF ROTOR

BACKGROUND OF THE INVENTION

1. Field of the Invention

The present invention relates to an optical encoder and, more particularly, to a small optical encoder in which manufacturing costs can be suppressed and detection accuracy is improved.

2. Related Background Art

FIG. 8 is a perspective view showing a conventional rotary encoder.

A rotary encoder 1 shown in FIG. 8 is employed, for example, in a tape recording/reproducing apparatus which does not use a capstan and is constructed so that the rotary shaft 2 of the rotary encoder is rotated with travel of a tape.

The rotary encoder 1 comprises a rotor 3 fixed to the rotary shaft 2 and a stator 4 partially facing the rotor 3. Slits 6 are patterned so as to circumferentially alternately provide passing regions and shielding regions of light like a bar code in the circumference of the rotor 3. In the stator 4, slits 5 are formed in a part of the fan shape. The slits 6 are patterned so as to overlap with the slits 5 formed in the stator 4 when the rotor 3 is rotated.

A light emitting diode (LED) or the like is used as a light emitting device 7 and a photo diode (PD) or the like is used as a photo sensing device 8. Light emitted from the light emitting device 7 passes through the slits 5 and 6 formed in the rotor 3 and the stator 4, detected by the photo sensing device 8, and converted to an electric signal (envelope signal). By processing the envelope signal by electric means (not shown), the rotational speed of the rotor, a phase deviation, and the like can be detected. Consequently, the speed at the time of travelling, wow and flutter, and the like of the tape recording/reproducing apparatus can be controlled.

In the conventional rotary encoder 1, since overlap information (envelope signal) of the patterns of the slits 5 and 6 is obtained by detecting only a part of the whole slits 6 formed in the rotor 3, the signal level is low and much noise is included, so that the accuracy is not high. In order to suppress the noise and to obtain a high output level, an expensive linear light source is necessary. Further, since a positional deviation between the light source and the center of the photo sensing device or a positional deviation between the slits 5 and 6 largely affects the performance of the encoder 1 itself, for example, the encoder 1 itself becomes the occurrence source of wow and flutter and the performance as an optical encoder becomes defective. On the other hand, when the performance is sought too much, a high degree of assembly technique is requested and a problem such that it cannot be easily assembled at the time of production occurs.

For instance, when it is assembled in a state where the centers of the rotary shaft 2, the rotor 3, and the slit patterns are deviated from each other by 5 $\mu$m in the radial direction, it was confirmed that only an extremely weak envelope signal is outputted due to the deviation. Since the weak signal includes many noise signals, it exerts an adverse influence on subsequent electric processes. Consequently, whether a reliable envelope signal can be obtained or not depends on how accurately the two slit patterns can be set and the concentric precision (concentricity) between the rotor in which the two slits are formed and the rotary shaft can be obtained.

SUMMARY OF THE INVENTION

The invention is made to solve the problems of the conventional technique and it is an object to provide an optical encoder which can detect a rotational speed, a phase deviation, and the like with high accuracy while absorbing the tolerance of the parts by detecting information regarding slits formed on the whole circumference in each of a rotor and a stator even when a slight deviation occurs in the rotation of the rotor.

It is another object of the invention to provide an optical encoder at low cost in which the reliability of detection accuracy is improved.

An optical encoder of the invention comprises: first and second supporting bodies which transmit light; a rotor which is rotatably axially supported between the first and second supporting bodies and can transmit light in an outer circumferential part; a light emitting device arranged on one side of a rotary axis of the rotor and a photo sensing device arranged on the other side; and slits circumferentially provided on an end face of the outer circumferential part of the rotor at a predetermined pitch and slits circumferentially provided on the second supporting body side so as to face the foregoing slits at the same predetermined pitch, characterized in that a first reflection curved face for reflecting light emitted along the axial line from the light emitting device radially around the axial line as a center and allowing the light to enter the slits formed in the outer circumferential part of the rotor is formed in the first supporting body, a light guiding part for guiding the light entered the outer circumferential part into a cylindrical region of the outer circumferential part is formed in the outer circumferential part of the rotor, and a second reflection curved face for directing the light transmitted through the outer circumferential part and passed through both of the slits along the axial line to the photo sensing device is formed in the second supporting body.

In the foregoing, it is preferable that at least one of the first reflection curved face and the second reflection curved face is formed in such a manner that the light emitting device side or the photo sensing device side is the narrowest and the face is gradually enlarged toward an opening end and is formed in a curve in cross section. It is also preferable that the dimension in the radial direction of the slit formed on the rotor side is larger than the dimension in the radial direction of the slit formed on the second supporting body side.

A structure such that a covering part for covering a part where the slits face each other from the outer circumference side is formed projectingly in the outer circumference part of the rotor or the supporting body side can be used.

Further, at least one of the supporting body and the rotor can be made of a light transmitting synthetic material which transmits only light of a specific wavelength.

Further, it is preferable that a light transmitting adhesive having a refractive index smaller than that of the material of the supporting body and larger than that of the material of the cover is interposed between the cover of the light emitting device or the photo sensing device and a recessed part formed in the supporting body into which the cover is fit.

In the optical encoder according to the invention, light emitted from the light emitting device is reflected by the first reflection curved face formed in the first supporting body to be diffused so that the light travels in a direction which is almost perpendicularly apart from the axial direction and is further guided by a light guiding part formed in the outer circumferential part of the rotor to a cylindrical region parallel to the rotary shaft, passed through the cylindrical region and reflected and guided. The light enters the second supporting body via the slits formed on an end face of the rotor and the slits formed at the edge of the stator. Further, the light is reflected by the second reflection curved face formed in the second supporting body and, after that, received by the photo sensing device. As mentioned above, in the optical encoder of the invention, since all of light passed through all of the slits formed in the rotor and the stator is collected and detected by one photo sensing device (FG), the signal level at the time of detection can be increased. Since errors occurring in the respective slits can be absorbed as a whole, the detection accuracy can be improved as compared with a conventional encoder without depending on slit pattern accuracy, the assembly accuracy, and the like. A cheap light source such as a diffusion light source can be also used as a light emitting device. Further, the structure in which the light emitting device and the photo sensing device face each other on both sides of the axial line of the rotary shaft of the rotor is used, the whole structure is simple and the size can be reduced.

Since each of the first and second reflection curved faces has the shape of either a parabolic curved face, a circular curved face, or an aspheric face in cross section taken on the axial line, the light diffused and emitted from the light emitting device is reflected in the direction perpendicular to the axial line, that is, radially in the direction toward the outer circumferential part of the rotor while the light flux obtained by the reflection is not diffused.

The members constructing the optical encoder of the invention can be constructed by optical members which can be easily processed. That is, a high degree of process accuracy requested at the time of processing the slits and assembly of a conventional encoder is made unnecessary, so that the manufacturing cost can be reduced. By achieving the assembly by fitting the members, the assembly accuracy can be inevitably improved and the encoder can be easily assembled. Thus, an encoder with high detection accuracy can be provided at low cost.

DETAILED DESCRIPTION OF THE PREFERRED EMBODIMENTS

The invention will be described hereinbelow with reference to the drawings.

Figure 1:
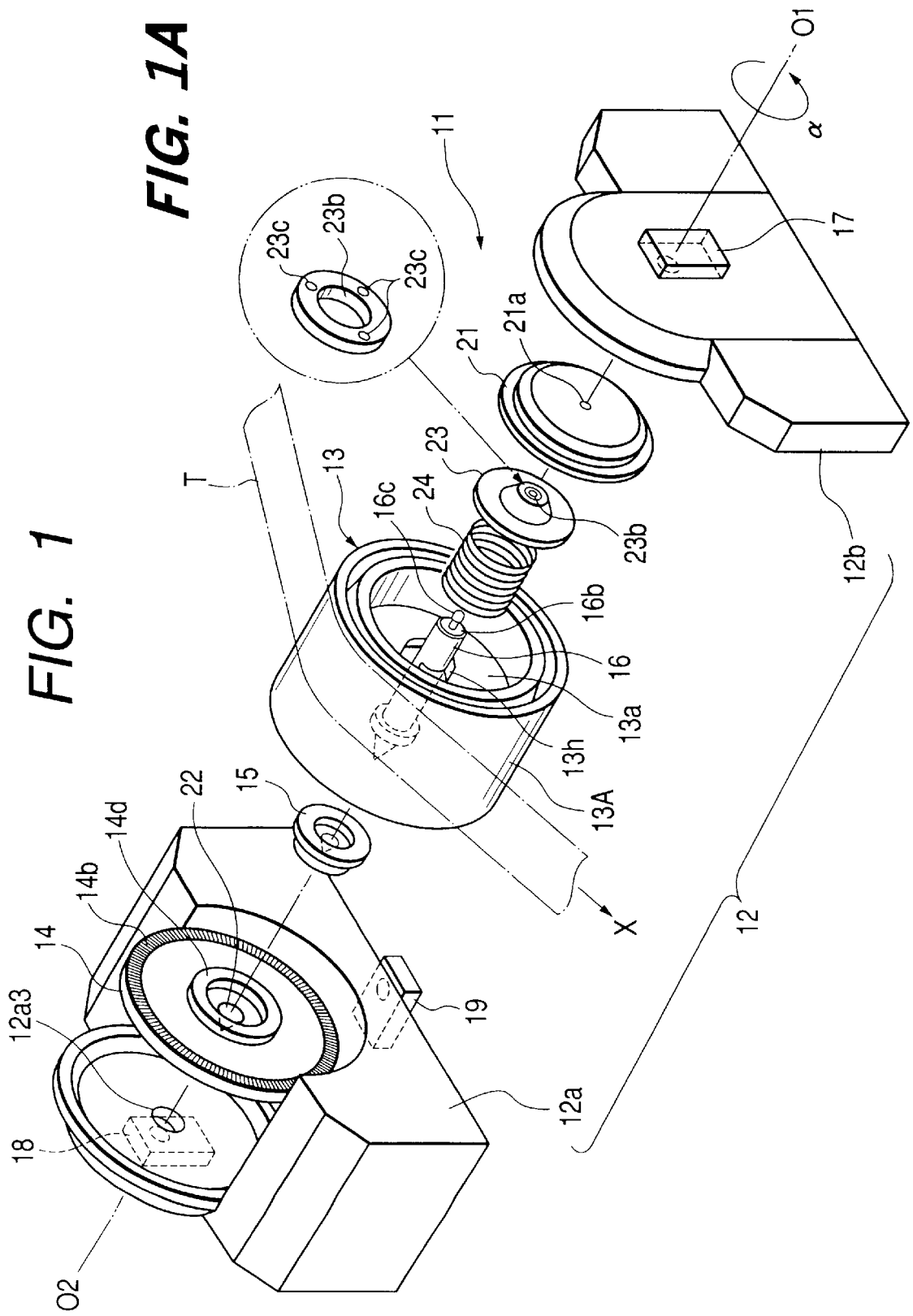
FIG. 1 is an exploded perspective view of an optical encoder according to the invention.
Figure 2:
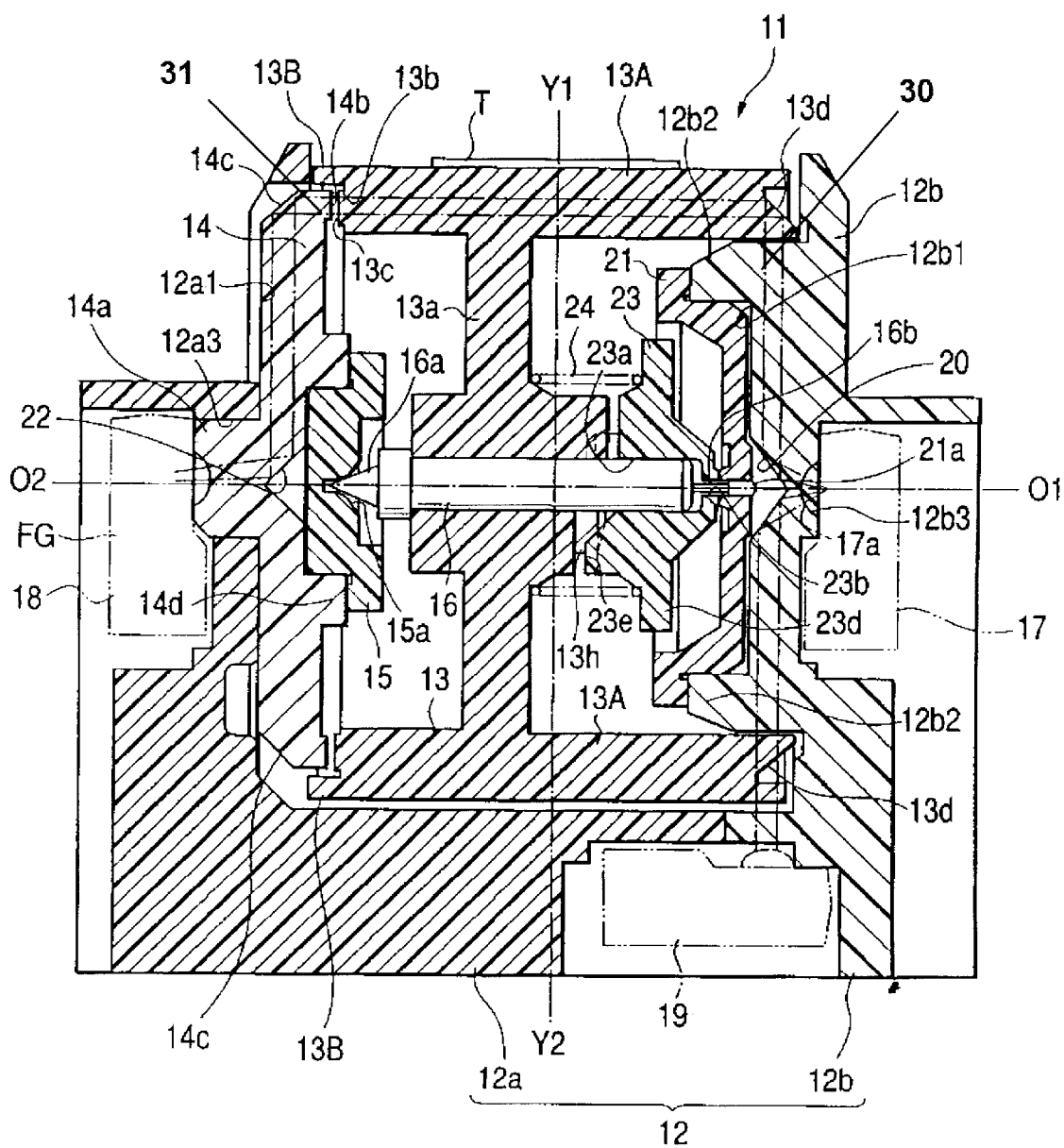
FIG. 2 is a cross section of a plane taken on an axial line O of the optical encoder of FIG. 1.
Figure 3:
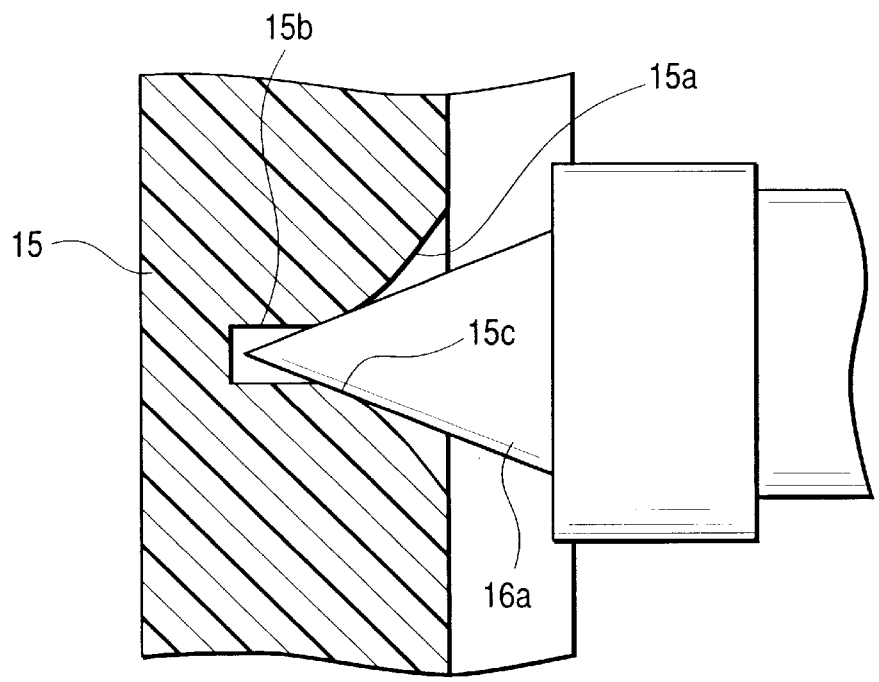
FIG. 3 is a cross section showing a supporting structure at one end of a rotary shaft.
Figure 4:
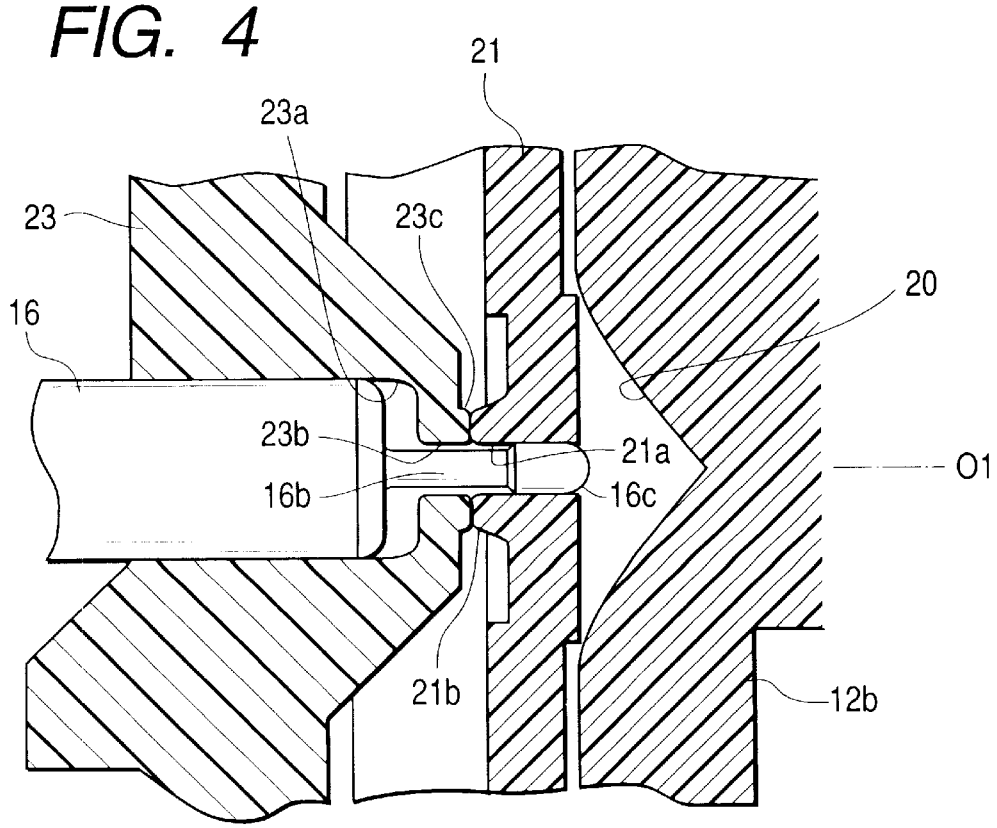
FIG. 4 is a cross section showing a supporting structure at the other end of the rotary shaft.

FIG. 1 is an exploded perspective view of an optical encoder according to the invention. FIG. 2 is a cross section of a plane taken along the axial line of the optical encoder of FIG. 1. FIG. 3 is a cross section showing a supporting state at one end of a rotary shaft. FIG. 4 is a cross section showing a supporting state at the other end of the rotary shaft.

An optical encoder 11 shown in FIGS. 1 and 2 is constructed in such a manner that two main members of a rotor 13 and a stator 14 serving as a second supporting body are attached into a supporting body 12. The rotor 13 and the stator 14 are made of a light guiding material for transmitting light, for example, a transparent material such as acrylic. The supporting body 12 is constructed by a supporting body 12a on the left side and a supporting body 12b on the right side. The supporting body 12b on the right side serves as a first supporting body made of a light guiding material. The stator 14 serving as a second supporting body and the rotor 13 are held between the supporting bodies 12a and 12b.

The outer circumferential part of the rotor 13 is a cylindrical part 13A formed in a cylindrical shape and a rotary shaft 16 is integrally formed in the cylindrical part 13A. The rotor 13 is rotatably supported by a bearing member 15 on the stator 14 side and a bearing member 21 on the supporting body 12b side which are provided in the supporting body 12. The rotary shaft 16 of the rotor 13 is positioned on the axial line O (O1–O2).

As shown in the right end part of FIG. 2, a light emitting device 17 constructed by a light emitting diode (LED) or the like is embedded in the first supporting body 12b and light is emitted from the light emitting device 17 along the axial line O toward O2. In the central part of the inner wall of the first supporting body 12b, a first reflection curved face 20 opened toward O2 along the axial line O is formed in a trumpet shape in cross section. The first reflection curved face 20 is formed so that the deepest part is the narrowest and is a curved face which gradually opens from the deepest part to the open end. The curved face is formed by a large parabolic face or a circular curved face having a large curvature. The first reflection curved face 20 can reflect the light emitted from the light emitting device 17 so as to be radially diffused in the direction which perpendicularly crosses the axial line O and in the direction at 360°. Since the cross section of the first reflection curved face 20 is a parabolic curved face, even if light emitted from the light emitting device 17 is light to be diffused in the axial line O direction, the light reflectedby the first reflection curved face 20 is not diffused in the axial line O direction but is reflected in the radial direction as almost parallel light when seen in the cross section shown in FIG. 2.

The bearing member 21 in an almost crown shape is fixed to the inner wall face 12b1 of the first supporting body 12b including the first reflection curved face 20. In the central part of the bearing member 21, a bearing hole 21a through which a thin shaft 16b formed on the right end of the rotary shaft 16 of the rotor 13 is inserted is opened. Both of the center of the bearing hole 21a and the deepest part (narrowest part) of the first reflection curved face 20 are positioned on the axial line O.

The stator 14 serving as the second supporting body having a lid shape in cross section is fixed to the inner wall face 12a1 of the supporting body 12a on the left side and a projection 14a in the center projected toward O2 in the diagram is inserted into a supporting hole 12a3 opened in the supporting body 12a. A first photo sensing device 18 constructed by a photo diode (PD) or the like is provided on the end face of the projection 14a.

The first photo sensing device 18 is a rotational speed detector (hereinbelow, called an FG (Frequency Generator) 18) and can receive the light emitted from the light emitting device 17 as will be described hereinlater. In the center of the right end face in the diagram of the stator 14, a second reflection curved face 22 notched in a trumped shape in cross section in a manner similar to the first reflection curved face 20 is formed. A holding part 14*d* is formed on the right end face of the stator 14 including the second reflection curved face 22 and the bearing member 15 on the stator side is fixedly fit into the holding part 14*d*. On the right end face in the diagram of the bearing member 15 on the stator side, a bearing part 15*a* in a trumpet shape similar to the first and second reflection curved faces 20 and 22 is formed. As shown in FIG. 3, the deepest part of the bearing part 15*a* is notched toward the O2 direction in a cylindrical shape in the diagram (hereinbelow, called a cylindrical part 15*b*) and the axial line O is positioned in the center of the cylindrical part 15*b*. A reflection face 14*c* inclined along the whole circumference is provided a the edge of the stator 14.

A left end part 16*a* in the diagram of the rotary shaft 16 of the rotor 13 is formed in a conical shape (sharp shape) and is inserted into the cylindrical part 15*b* of the trumpet-shaped bearing part 15*a*. Consequently, as shown in FIG. 3, so-called a pivot bearing in which the outer peripheral face (taper face) of the end part 16*a* is in contact with the edge 15*c* of the cylindrical part 15*b* is formed.

On the right end of the rotary shaft 16 is extremely narrowed as compared with the diameter of the rotary shaft 16 and a bearing part 16*c* is formed at the end. A thin shaft 16*b* is further formed between the rotary shaft 16 and the bearing part 16*c*. The rotary shaft 16 is inserted into a holding hole 23*a* opened in a spring bracket member 23. Since the thin shaft 16*b* is loosely fit into an insertion hole 23*b*, the rotary shaft 16 is not guidedby the insertionhole 23*b* but is slidably guided in the axially direction only by the holding hole 23*a*. Since the double guiding by the holding hole 23*a* and the insertion hole 23*b* can be therefore avoided, interference by each other at the time of rotation is prevented. The bearing part 16*c* passes through the insertion hole 23*b* opened in the center of the spring bracket member 23 and is supported by the bearing hole 21*a* formed in the bearing member 21. Positioning in the radial direction is performed by the bearing part 16*c* and the bearing hole 21*a*. That is, the rotor 13 is pivotally supported by the end part 16*a* of the rotary shaft 16 inserted into the cylindrical part 15*b* of the bearing part 15*a* formed in the bearing member 15 on the left end side in the diagram and the bearing part 16*c* inserted into the bearing hole 21*a* formed in the bearing member 21 on the right end side. Thus, by positioning the cylindrical part 15*b* and the bearing hole 21*a* to the center of the axial line O, the rotary shaft 16 is coincided with the axial line O.

As shown in FIG. 4, the surrounding part of the insertion hole 23*b* on the right end face of the spring bracket member 23 is slightly projected toward O1 and a semi-spherical projection 23*c* which is in contact with the bearing member 21, for example, at three points is circumferentially provided. Around the bearing hole 21*a* of the bearing member 21 facing the spring bracket member 23, an annular projection 21*b* slightly projected toward O2 is formed. On the other hand, on the left end (O2) side of the spring bracket member 23, for example, nails 23*e* are formed like three blades around the holding hole 23*a*. On the rotor 13 side, nails 13*h* like three blades which are engaged with the nails 23*e* are circumferentially formed (refer to FIG. 1 or 2). When the rotor 13 is rotated, the nails 13*h* and 23*e* are come into contact with each other, so that the rotor 13 and the spring bracket member 23 can be integrally rotated. In this instance, since the projections 23*c* at three points come into contact with the annular projection 21*b* as mentioned above, slide resistance at the time of rotation between the bearing member 21 and the spring bracket member 23 is reduced and a torque loss of the rotor 13 is suppressed.

By employing the structure that the rotary shaft 16 is supported by the cylindrical part 15*b* (pivot bearing) and the bearing hole 21*a*, durability when the rotary shaft 16 of the rotor 13 is deviated in the radial direction can be improved more as compared with a case where, for example, pivot bearings are used at both ends. For instance, in a case where the tape speed is detected while making the tape T come into press contact with the outer peripheral part of the cylindrical part 13A of the rotor 13, the durability against the movement of the tape T (especially, tension fluctuation in the tape due to the change in speed) is enhanced, so that speed detection accuracy can be improved.

A spring member 24 constructed by a coil spring or the like is provided around the rotary shaft 16 between the supporting part 13*a* of the rotor 13 and the spring bracket member 23. The end part on the O1 side of the spring member 24 is in press contact with a receiving part 23*d* of the spring bracket member 23 and the other end on the O2 side is in press contact with the supporting part 13*a* of the rotor 13. Consequently, the whole rotor 13 is energized in the O2 direction in the diagram by the repulsion of the spring member 24 and the spring bracket member 23 is simultaneously energized in the O1 direction. With respect to the spring bracket member 23 and the bearing member 21, the annular projection 21*b* and the projection 23*c* are come into contact with each other, thereby preventing occurrence of backlash in the axial line O direction in the rotor 13.

The degree of freedom in the thrust suppressing direction by the spring action is assured by the spring bracket member 23 which guides the rotary shaft 16. Since the distance between the slits 13*c* and 14*b* can be accordingly maintained to be constant along the whole circumference, the output signal detected by the FG 18 can be stabilized.

Even in a case where an action by which the rotary shaft 16 is deviated from the axial line O is incurred by the movement of the tape T, since the rotary shaft 16 of the rotor 13 has the structure such that the outer peripheral face of the end part 16*a* comes into contact with the edge 15*c* of the cylindrical part 15*b*, the rotary shaft 16 is inevitably returned to the axial line O. Consequently, automatic adjustment is realized at low cost, and moreover, the torque loss is reduced and the assembly performance can be improved. On the right end side, the thin shaft 16*b* is inserted into the bearing hole 21*a* of the bearing member 21, thereby maintaining the center of the rotary shaft 16 on the axial line O. By forming so as to maintain the high concentricity between the rotor 13 and the rotary shaft 16, deviation or wow and flutter does not easily occur when the rotor 13 is rotated.

The projection 14*a* of the stator 14 is fit into a supporting hole 12*a*3, the bearing member 15 of the stator is fit into the holding part 14*d* of the stator, and the bearing member 21 is fit into a supporting part 12*b*2 of the first supporting body, thereby enabling the members to be positioned. Since the above members can be made of a light guiding material, by increasing the accuracy of the dies, the processing accuracy of each member can be increased.

Figure 5A:
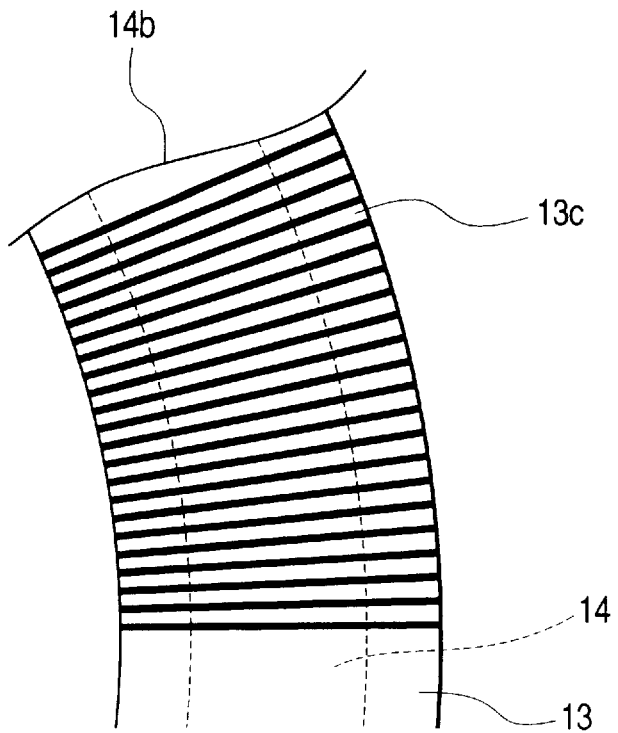
FIG. 5A is a diagram showing a state where slits face each other and FIG. 5B is a cross section of FIG. 5A.
Figure 5B:
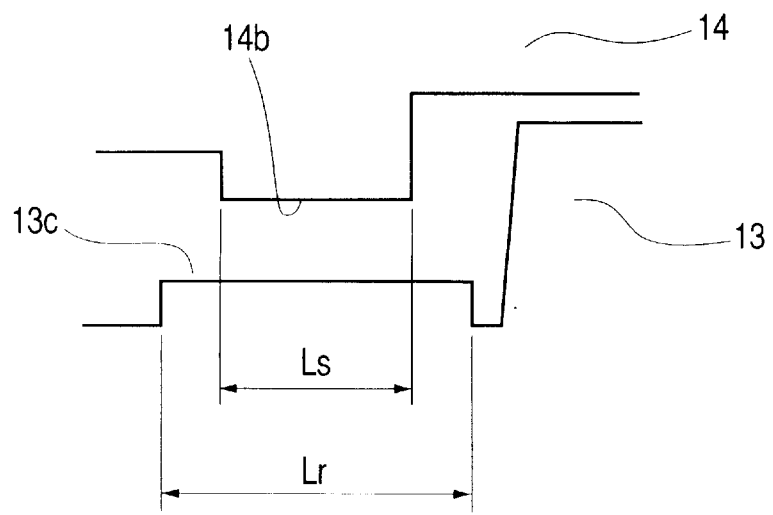
Figure 6A:
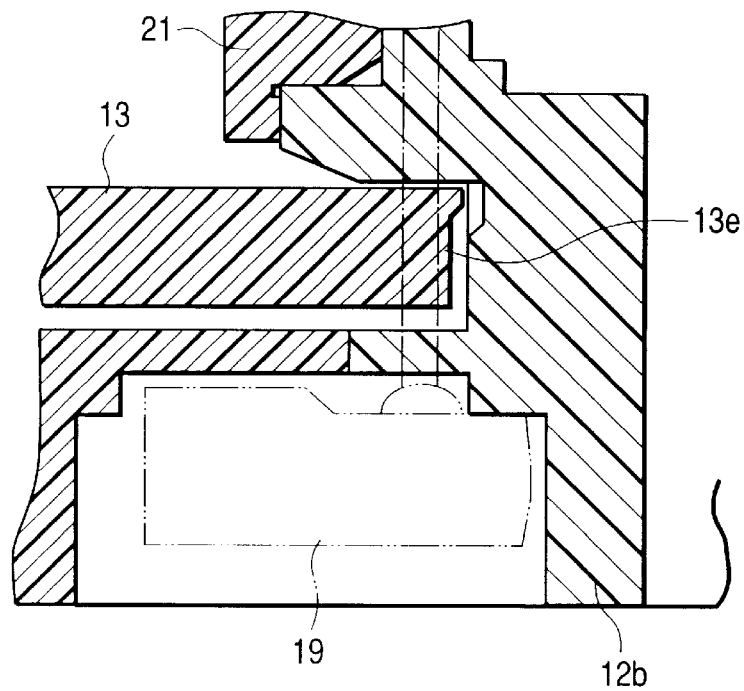
FIG. 6A is a cross section showing one mode of a passing band of a rotor and FIG. 6B is a cross section showing another mode of the passing band.
Figure 6B:
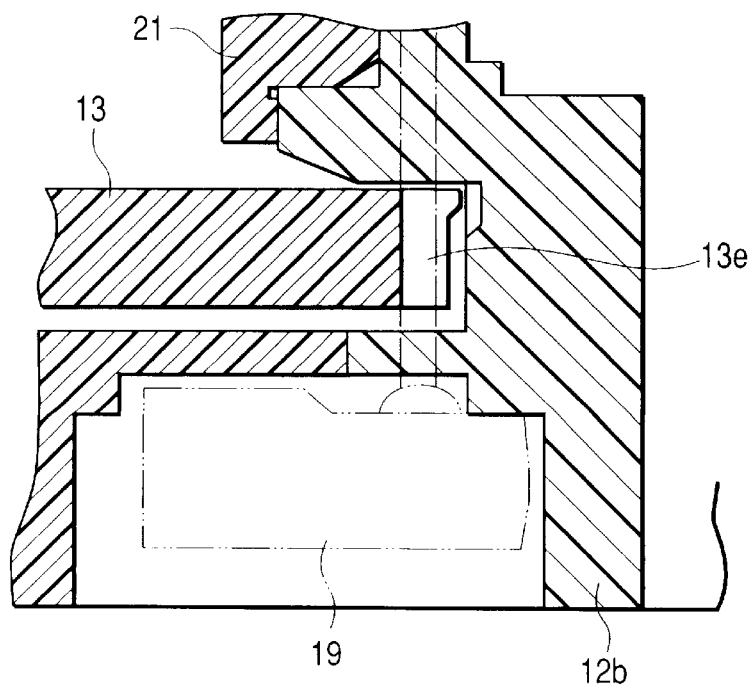

FIG. 5A is a plan view showing that slits of the rotor 13 and those of the stator 14 are overlapped and FIG. 5B is a cross section of FIG. 5A. FIG. 6 shows the right end face of the rotor. FIG. 6A is a cross section showing one mode of a passing band and FIG. 6B is a cross section showing another mode of the passing band.

As shown in FIG. 2, at the edge of the inner wall of the stator 14, slits 14b by which passing regions and shielding regions are alternately formed are provided at a predetermined pitch in the whole circumference. As shown in FIG. 1, on an end face 13b of the cylindrical part 13A as the outer circumferential part of the rotor 13 facing the slits 14b by the face which perpendicularly crosses the rotary shaft 16, slits 13c similar to those of the stator 14 are formed on the whole circumference at the same pitch. The number of the slits 14b formed in the stator 14 and the number of the slits 13c formed in the rotor 13 are set to be the same in consideration of the relation between the period of the FG 18 and the slit use efficiency.

As shown in FIGS. 5A and 5B, in the facing part of the rotor 13 and the stator 14, the slits are formed so that a linear dimension Lr in the radial direction of each slit in the rotor 13 is larger than a linear dimension Ls in the radial direction of each slit in the stator 14 (Ls<Lr). Consequently, even in a case where a deviation or the like due to wear or the like comes to occur, for example, in the rotation of the rotor 13, if the deviation is within an allowable range, the overlap after deviation of the slit 13c of the rotor 13 and the slit 14c of the stator 14 can be maintained. Since the quantity of light transmitted to the stator 14 side can be therefore always maintained to be constant, the signal level outputted from the FG 18 can be stabilized. The parts processing accuracy and the assembly accuracy can be absorbed to a certain degree, so that even if the accuracy required for the parts assembly is reduced, stability can be obtained. Thus, an optical encoder can be realized at low cost.

On the other hand, as shown in FIG. 2, on the right end face of the cylindrical part 13A, a reflection face 13d inclined and notched in an almost triangle shape in cross section is annually circumferentially provided and a light guiding part is formed. As shown in FIG. 6A, a part of the right end face of the rotor 13 is not notched in the axial direction and serves as a passing band 13e in which the reflection face 13d is not formed. The passing band can be also formed as shown in FIG. 6B so that a part completely axially penetrates the rotor 13.

A rotation phase detector constructed by a second photo sensing device 19 (hereinbelow, called a PG (Pulse Generator) 19) is provided near Y2 of FIG. 2. The PG 19 is provided in a position facing the passing band 13e. Light is transmitted in the Y2 direction only when the passing band 13e and the PG face each other by the rotation of the rotor 13 and the light can be detected by the PG 19.

The principle of operation of the optical encoder constructed as mentioned above will be described.

The optical encoder has, as shown in FIGS. 1 and 2, the construction such that the outer peripheral face of the cylindrical part 13A of the rotor 13 comes into press contact with the magnetic recording tape T and the rotor 13 is rotated. When the tape T is fed, the tape tension causes wear resistance between the cylindrical part 13A and the tape contacting face by the feeding force. A relative speed at the contact point between the rotor 13 and the tape T in this instance is kept at 0 and the feed of the tape T is certainly converted into a rotation of the rotor 13.

As shown in FIG. 2, in the first supporting body 12b, the light emitted from the light emitting device 17 is irradiated along the axial line O toward the first reflection curved face 20 formed in the supporting body. As mentioned above, since the first reflection curved face 20 is formed by either a parabolic face, a circular curved face, or an aspheric surface having a large curvature, the reflection curved face can reflect so that diffusion light emitted from the light emitting device 17 is diffused in the direction of 360° which perpendicularly crosses the axial line O, that is, radially diffused toward the reflection face 13d (light conducting part) annually formed on the right end face of the rotor 13 and that the light is not diffused in the axial line O direction.

The light reflected by the first reflection curved face 20 is transmitted through the first supporting body 12b made of a light guiding member in the direction apart from the axial line O and reaches the reflection face 13d (light guiding part) circumferentially formed in the rotor 13 through a circumferential part 30 having an outer shape corresponding to that of the rotor 13. The light is reflected by the reflection face 13d of the rotor 13 and enters the cylindrical part 13A in the rotor 13. In this instance, the light is reflected by the reflection face 13d in the direction parallel to the axial line O, so that the light travels straight through the cylindrical part 13A toward O2 or is reflected and guided in the cylindrical part 13 and transmitted to the slits 13c formed in the left end face of the rotor 13. Although the light once goes out from the left end face of the rotor 13 in which the slits 13c are formed to the outside, it enters again a circumferential part 31 of the stator 14 provided so as to face the left end face of the rotor 13. In this instance, the light enters the slits 14b circumferentially formed at the edge of the inner wall of the stator 14 and falls on the reflection face 14c formed on the outer periphery of the stator.

Although the light is condensed in the axial line O direction by the reflection face 14c, it is reflected by the second reflection curved face 22 formed in the supporting body 12a. In this instance, since the second reflection curved face is formed in a trumpet shape, the reflection light is condensed to almost one point. Consequently, the photo sensing part of the FG 18 can efficiently receive the converged light.

The light reflected by the first reflection curved face 20 travels toward the reflection face 13d of the rotor 13. Since the passing band 13e is, however, formed in the reflection face 13d of the rotor 13 as described above, the PG 19 can receive light only when the PG 19 faces the passing band in the event of rotation of the rotor 13. That is, since light is received by the PG 19 every rotation of the rotor, the PG 19 can transmit a light detection signal every rotation of the rotor 13. Consequently, the light detection signal is detected and checked with a reference clock (not shown), thereby enabling a deviation in the rotation phase of the rotor 13 or the like to be detected.

Only the light which has passed the passing region of the slits 13c circumferentially formed on the left end face of the rotor 13 radiates and further enters via the passing region of the slits 14b circumferentially formed in the stator 14 on the left end. It is constructed so that only the slits 13c on the rotor 13 side are rotated and the slits 14b on the supporting body side are fixed. When the rotor 13 is rotated, a case where the passing regions (shielding regions) are overlapped (refer to FIG. 5A) and a case where the passing region and the shielding region are overlapped are alternately repeated. For example, as shown in FIG. 5A, at the moment when the passing regions (shielding regions) of the slits are overlapped during the rotation of the rotor 13, light is guided from the rotor 13 to the supporting body 12a via each of the passing regions, so that the quantity of light detected by the FG 18 becomes maximum. On the other hand, at the moment when the passing region and the shielding region are completely overlapped, since the whole region becomes a shielded region, the light becomes refractive incident light (scattered light) which cannot be converged to the photo sensing part and the quantity of light detected by the FG 18 becomes the minimum by the effect of shielding light from the photo sensing part.

The light detection signal from the FG 18 by the above detection becomes an envelope signal. The instantaneous frequency of the signal is in proportional to the instantaneous angular velocity of the rotor 13. Consequently, by electrically processing the signal from the FG 18, the rotational speed can be detected.

In the optical encoder 11 of the present invention as described above, all of information of passage or non-passage of light through the slits 13*c* or 14*b* in the whole circumference can be totally obtained and the information can be converged and detected by one FG at once, so that detection accuracy can be much improved as compared with the conventional technique. Influence by an parts error of the slits and the deviation in the concentricity of the slit patterns can be absorbed.

As shown in FIG. 2, the left end face of the cylindrical part 13A of the rotor 13 is projected toward O2 from the face in which the slits 14*b* are formed of the stator 14 and a covering part 13B for surrounding and hiding the part where the slits are overlapped is formed. On the other hand, on the right end side of the rotor, for the supporting part 12*b*2 for the bearing member 21 formed so as to project toward O2 from the inner wall face of the first supporting body 12*b*, the right end part (part having the reflection face 13*d*) of the cylindrical part 13A itself is projected toward O1, thereby forming a covering part similar to that on the left end part. Consequently, it is prevented that magnetic powders or the like adhered to the recording tape T penetrate a gap between the rotor 13 and the stator 14 or between the rotor 13 and the first supporting body 12*b*. Smooth rotation of the rotor 13 can be therefore maintained and the quantity of light passing through the gap is not reduced.

In the above, it is preferable that at least one of the rotor 13, the stator 14, and further the first supporting body 12*b* is made of a light transmitting synthetic material in which a substance that does not pass light of wavelengths except for a specific wavelength is mixed. Thus, light in a visible light region can be shielded. In the photo sensing device (FG 18 or PG 19), light of wavelengths except for the wavelength selected by the rotor 13 or the stator 14 is not received by the photo sensing device 17, so that the influence by the disturbance light can be prevented and occurrence of noises in the envelope signal can be suppressed.

Figure 7:
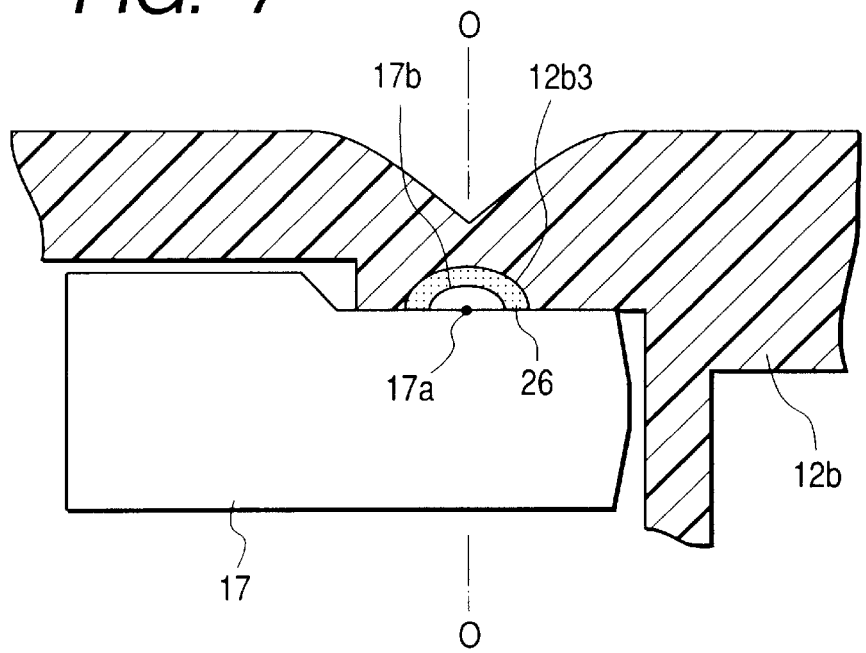
FIG. 7 is a cross section showing a supporting body and a light emitting device or a photo sensing device.
Figure 8:
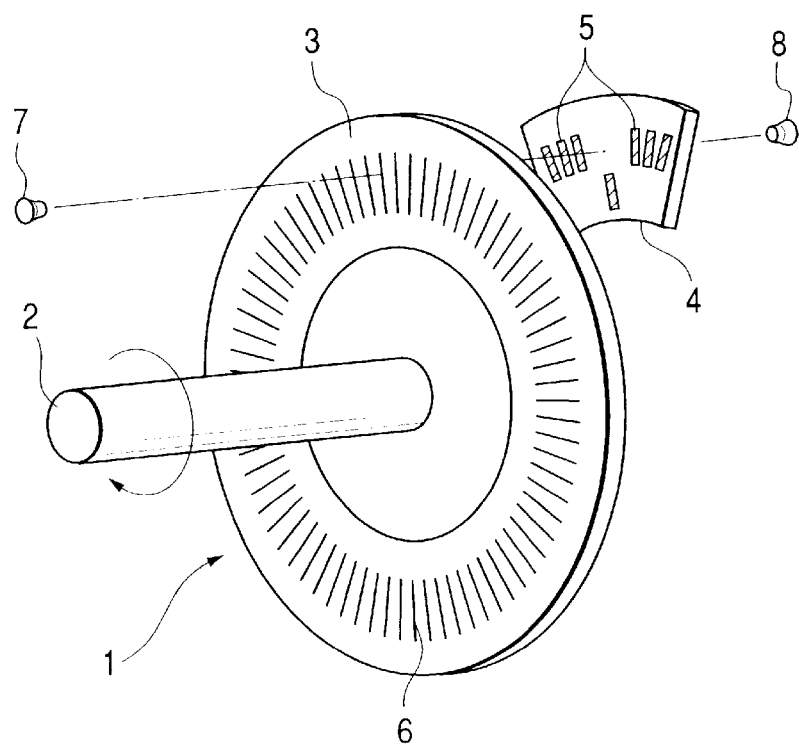
FIG. 8 is a perspective view showing a conventional rotary encoder.

FIG. 7 is a cross section showing the supporting body and the light emitting device or the photo sensing device.

As shown in FIG. 7, the light emitting device 17 is fixed in such a manner that a cover 17*b* for covering the light source of the light emitting device 17 or a lens positioned in front of the light emitting device is loosely fit in the recessed part 12*b*3 formed in the first supporting body 12*b* on the axial line O. Preferably, a light transmitting adhesive 26 having a refractive index larger than that of the material of the cover or the lens and is smaller than that of the material of the supporting body is enclosed between the cover 17*b* and the inner face of the recessed part 12*b*3 and is joined. Since the adhesive 26 has a refractive index larger than that of air, the light from the light source 17*a* of the light emitting device 17 can be emitted in a condensed state. The efficiency for utilization of the light from the light emitting device 17 can be therefore improved.

Similarly, in the photo sensing device (FG 18 and PG 19), it is preferably join by enclosing alight emitting agent having a refractive index smaller than that of the material of the stator 14 or the first supporting body 12*b* and larger than that of the cover of the photo sensing device or the lens. By using such an adhesive, the condensing efficiency to the photo sensing part in each of the photo sensing devices 18 and 19 is increased, so that the performance of the photo sensing devices 18 and 19 can be improved.

That is, by using the refractive index of the adhesive, light is condensed and irradiated to be more parallel to the axial line upon irradiation and is more condensed and received upon light reception. The efficiency for light utilization can be therefore improved and the detection accuracy of the optical encoder can be improved.

As mentioned above, since the quantity of light received by the photo sensing device side can be increased, the detection signal level of the envelope signal generated from the photo sensing device can be accordingly increased. Thus, the optical encoder with higher detection accuracy which is not easily influenced by noises can be provided.

With respect to the optical paths in the first and second supporting bodies from the first supporting body to the light guiding part of the rotor, the invention is not limited by the above embodiment but can be variably modified.

Further, although the slits are arranged so as to face each other in planes which perpendicularly cross the rotary shaft in the embodiment, the invention is not limited by the arrangement. The slits can be also arranged so as to face each other in planes which are in parallel to the rotary shaft.

It is preferable that the supporting body 12 is provided with a tape contacting part for adjusting (lap controlling) the contact amount of the rotor 13 and the tape T in order to stabilize a travel line at the time of tape travel and improve reproducibility and reliability. For example, it is sufficient to provide the rotor 13 or the supporting body 12 with a tape guide so that an almost center part of the support length of the rotor 13 where vibration accuracy is stabilized becomes a tape travel line. Alternatively, the supporting body 12 can have an inclined part or a recessed curved face which comes into contact with one (edge part extending in the longitudinal direction) of both ends in the width direction of the tape and by which the tape travel line is pushed to one side.

According to the invention described above in detail, the assembly process can be facilitated and shaft adjustment of the rotor or the like can be made unnecessary, so that the manufacturing cost can be reduced.

Since the quantity of light upon reception in the photo sensing device is increased, the signal level generated from the photo sensing device is increased and the influence by noises is not easily exerted. Consequently, the detection accuracy can be improved. Since the efficiency for utilization of the light emitting device and the photo sensing efficiency is improved, for example, a cheap LED of a normal radiation type or a PTR having a low sensitivity and in which the photo sensing center is unclear can be used.

Especially, since the light emitting device and the photo sensing device are positioned on both sides of the rotary shaft on the axial line of the rotary shaft of the rotor, the size of the whole structure is reduced and the structure is simplified.

What is claimed is:

1. An optical encoder comprising:

first and second supporting bodies which transmit light;

a rotor which is rotatably axially supported between said first and second supporting bodies, wherein said rotor is rotated with a rotating force at an outer circumferential surface of said rotor and is capable of transmitting light within an outer circumferential part of said rotor;

a light emitting device arranged on one side of a rotary axis of said rotor and a photo sensing device arranged on the other side of said rotor;

first slits circumferentially provided at a predetermined pitch in an end face of said outer circumferential part of said rotor opposing against said second supporting body and second slits circumferentially provided at the same predetermined pitch on said second supporting body so as to face said first slits on said rotor;

wherein said first supporting body includes a first reflection curved face for reflecting light emitted from said light emitting device along an axis of the rotary shaft of said rotor in a radial direction around said axis and passing said light through said first supporting body and at the same time an outer circumferential part of said first supporting body having an outer shape coincided with that of said rotor to cause said reflected light to be incident to said outer circumferential part of said rotor; and wherein said outer circumferential part of said rotor is formed with a light guiding part for guiding light incident to the outer circumferential part of said rotor, said second supporting body including a second circumferential part having an outer shape coincided with that of said rotor that is used to pass the reflected light passed within said outer circumferential part and through said first and second slits into said second supporting body, wherein said second supporting body includes a second reflection curved face for reflecting light incident from said second circumferential part in a direction along said axis to said photo sensing device.

2. An optical encoder comprising:

first and second supporting bodies which transmit light;

a rotor which is rotatably axially supported between said first and second supporting bodies, wherein said rotor is rotated with a rotating force at an outer circumferential surface of said rotor and is capable of transmitting light within an outer circumferential part of said rotor;

a light emitting device arranged on one side of a rotary axis of said rotor and a photo sensing device arranged on the other side of said rotor;

first slits circumferentially provided at a predetermined pitch in an end face of said outer circumferential part of said rotor opposing against said second supporting body and second slits circumferentially provided at the same predetermined pitch on said second supporting body so as to face said first slits on said rotor;

wherein said first supporting body includes a first reflection curved face for reflecting light emitted from said light emitting device along an axis of the rotary shaft of said rotor in a radial direction around said axis and passing said light through said first supporting body and at the same time an outer circumferential part of said first supporting body having an outer shape coincided with that of said rotor to cause said reflected light to be incident to said outer circumferential part of said rotor;

wherein said outer circumferential part of said rotor is formed with a light guiding part for guiding light incident to the outer circumferential part of said rotor, said second supporting body including a second circumferential part having an outer shape coincided with that of said rotor that is used to pass the reflected light passed within said outer circumferential part and through said first and second slits into said second supporting body, wherein said second supporting body includes a second reflection curved face for reflecting light incident from said second circumferential part in a direction along said axis to said photo sensing device; and wherein a light transmitting adhesive having a refractive index smaller than that of the material of said supporting body and larger than that of a first cover that is interposed between a second cover of the light emitting device or the photo sensing device and a recessed part formed in the first supporting body or the second supporting body into which said first cover is fit.

3. The optical encoder according to claim 1, wherein at least one of said first reflection curved face and said second reflection curved face is formed in such a manner that the light emitting device side or the photo sensing device side is the narrowest and the face is gradually enlarged toward an opening end and is formed in a curve in cross section.

4. The optical encoder according to claim 1, wherein the dimension in the radial direction of the slit formed on the rotor side is larger than the dimension in the radial direction of the slit formed on the second supporting body side.

5. The optical encoder according to claim 1, wherein a covering part for covering a part where the slits face each other from the outer circumferential side is formed projectingly in the outer circumferential part of the rotor or the supporting body side.

6. The optical encoder according to claim 1, wherein at least one of the first supporting body, the second supporting body and the rotor is made of a light transmitting synthetic material which transmits light of a specific wavelength.

* * * * *